United States Patent
Matsumoto

(10) Patent No.: US 12,477,233 B2
(45) Date of Patent: Nov. 18, 2025

(54) IN-VEHICLE EXPOSURE CONTROL DEVICE AND EXPOSURE CONTROL METHOD

(71) Applicant: Mitsubishi Electric Corporation, Tokyo (JP)

(72) Inventor: Tomohiro Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 18/279,513

(22) PCT Filed: Apr. 23, 2021

(86) PCT No.: PCT/JP2021/016404
§ 371 (c)(1),
(2) Date: Aug. 30, 2023

(87) PCT Pub. No.: WO2022/224423
PCT Pub. Date: Oct. 27, 2022

(65) Prior Publication Data
US 2024/0305894 A1    Sep. 12, 2024

(51) Int. Cl.
*H04N 23/73* (2023.01)
*H04N 23/611* (2023.01)
*H04N 23/71* (2023.01)

(52) U.S. Cl.
CPC ........... *H04N 23/73* (2023.01); *H04N 23/611* (2023.01); *H04N 23/71* (2023.01)

(58) Field of Classification Search
CPC ...... H04N 23/73; H04N 23/611; H04N 23/71; H04N 23/60; H04N 23/70; H04N 23/76

(Continued)

(56) References Cited

U.S. PATENT DOCUMENTS

2009/0251534 A1* 10/2009 Fujimoto .................. G06T 5/50
                                                                  348/78
2011/0141316 A1*  6/2011 Kubota .................. G06V 10/141
                                                                348/E9.053

(Continued)

FOREIGN PATENT DOCUMENTS

CN        111523473 A        8/2020
JP       2004078749 A    *  3/2004

(Continued)

OTHER PUBLICATIONS

Japanese Office Action for Japanese Application No. 2023-515986, dated Dec. 19, 2023, with English translation.

(Continued)

*Primary Examiner* — Thai Q Tran
*Assistant Examiner* — Stephen R Smith
(74) *Attorney, Agent, or Firm* — Birch, Stewart, Kolasch & Birch, LLP

(57) ABSTRACT

An in-vehicle exposure control device according to the present disclosure includes a face part detecting unit to detect a face part from the face information detected by the face detecting unit, a face part detection accuracy detecting unit to detect detection accuracy of the face part detected by the face part detecting unit, an exposure control target face part determining unit to determine, as an exposure control target face part, a face part in which the detection accuracy of the face part detected by the face part detection accuracy detecting unit is equal to or more than predetermined detection accuracy, and output a determination result, a luminance detecting unit to detect average luminance of the exposure control target face part, and an exposure control unit to control exposure in such a way that the average luminance of the exposure control target face part approaches target luminance.

4 Claims, 9 Drawing Sheets

(58) Field of Classification Search
USPC .......................................... 348/77, 364, 234
See application file for complete search history.

(56) References Cited

U.S. PATENT DOCUMENTS

| | | | | |
|---|---|---|---|---|
| 2011/0304746 | A1* | 12/2011 | Iijima | G03B 7/28 |
| | | | | 348/E5.037 |
| 2013/0222642 | A1* | 8/2013 | Watanabe | H04N 23/611 |
| | | | | 348/234 |
| 2013/0243274 | A1 | 9/2013 | Sukegawa et al. | |
| 2015/0036040 | A1* | 2/2015 | Konishi | H04N 23/45 |
| | | | | 348/364 |
| 2019/0377967 | A1* | 12/2019 | Yabuuchi | G06V 40/173 |
| 2021/0063844 | A1* | 3/2021 | Mine | H04N 25/131 |
| 2022/0048386 | A1* | 2/2022 | Popovic | H04N 23/75 |
| 2022/0132023 | A1* | 4/2022 | Kagaya | G06V 10/25 |

FOREIGN PATENT DOCUMENTS

| | | | |
|---|---|---|---|
| JP | 2009100252 A | * | 5/2009 |
| JP | 2011-118566 A | | 8/2011 |
| JP | 2013-198034 A | | 9/2013 |
| JP | 2016-189135 A | | 11/2016 |
| JP | 2018-151919 A | | 9/2018 |

OTHER PUBLICATIONS

Japanese Decision of Dismissal of Amendment for Japanese Application No. 2023-515986, dated Aug. 6, 2024, with English translation.
Japanese Decision of Refusal for Japanese Application No. 2023-515986, dated Aug. 6, 2024, with English translation.
International Search Report (PCT/ISA/210) issued in PCT/JP2021/016404, dated Jul. 27, 2021.
Japanese Office Action for Japanese Application No. 2023-515986, dated Apr. 30, 2024, with an English translation.

* cited by examiner

IN-VEHICLE EXPOSURE CONTROL DEVICE AND EXPOSURE CONTROL METHOD

TECHNICAL FIELD

The present disclosure relates to an in-vehicle exposure control device and an exposure control method.

BACKGROUND ART

Conventionally, there is known an in-vehicle exposure control device that controls exposure of a captured image when it is determined that a driver is wearing a mask on the captured image obtained by capturing the face of the driver (for example, Patent Literature 1). An exposure control unit that is included in the in-vehicle exposure control device and controls exposure of a captured image suppresses excessive exposure adjustment of the captured image by a mask (for example, a white mask), for example, in a case where it is determined that a driver is wearing the mask because a predetermined region (that is, the region where the mask is present) in a vertical downward direction with respect to a horizontal edge extracted at a mask end portion has a luminance value equal to or more than a predetermined luminance value. Thus, exposure to other parts (for example, eyes and the like) can be prevented from becoming inappropriate, and the line of sight of the driver can be detected.

CITATION LIST

Patent Literature

Patent Literature 1: JP 2011-118588 A

SUMMARY OF INVENTION

Technical Problem

Occupants including the driver in a vehicle may wear not only a mask but also various other accessories (for example, sunglasses and the like). In addition, the color of the mask is not limited to white, and various other colors may be used for the mask that is being worn. However, Patent Literature 1 does not specifically disclose a method of appropriately controlling exposure even in a case where accessories other than a mask or a mask other than a white mask is being worn.

The present disclosure has been made to solve the above-described problem, and an object thereof is to provide an in-vehicle exposure control device and an exposure control method capable of appropriately controlling exposure corresponding to various accessories being worn by an occupant.

Solution to Problem

An in-vehicle exposure control device related to the present disclosure includes: an image acquisitor to acquire a captured image of an occupant, the captured image being output from an imaging device that captures an image of the occupant in a vehicle; a face detector to detect face information of the occupant from the captured image acquired by the image acquisitor; a luminance detector to detect a first luminance, which is the luminance of a face or a part of the face of the occupant in the captured image, by using the face information detected by the face detector; and an exposure controller to control exposure in such a way that the first luminance detected by the luminance detector is target luminance, in which the luminance detector detects luminance of the face of the occupant as the first luminance, in a case where the face of the occupant is not covered by an accessory, and detects luminance of a region of the face excluding a part of the face that is covered by an accessory as the first luminance, in a case where the part of the face of the occupant is covered by the accessory.

Further, an exposure control method related to the present disclosure includes: acquiring a captured image of an occupant, the captured image being output from an imaging device that captures an image of the occupant in a vehicle; detecting face information of the occupant from the captured image acquired; detecting a first luminance, which is the luminance of a face or a part of the face of the occupant in the captured image, by using the face information detected; and controlling exposure in such a way that the first luminance detected is target luminance, in which luminance of the face of the occupant is detected as the first luminance, in a case where the face of the occupant is not covered by an accessory, and luminance of a region of the face excluding a part of the face that is covered by an accessory is detected as the first luminance, in a case where the part of the face of the occupant is covered by the accessory.

Advantageous Effects of Invention

An in-vehicle exposure control device and an exposure control method of the present disclosure determine whether or not a mask is being worn by using face information of an occupant, and control exposure in such a way that an average luminance detected from a determination result can approach a predetermined target luminance, and thus there is an effect that the exposure can be appropriately controlled even in a case where the occupant is wearing an accessory and covers the face part.

DESCRIPTION OF EMBODIMENTS

First Embodiment

Figure 1:
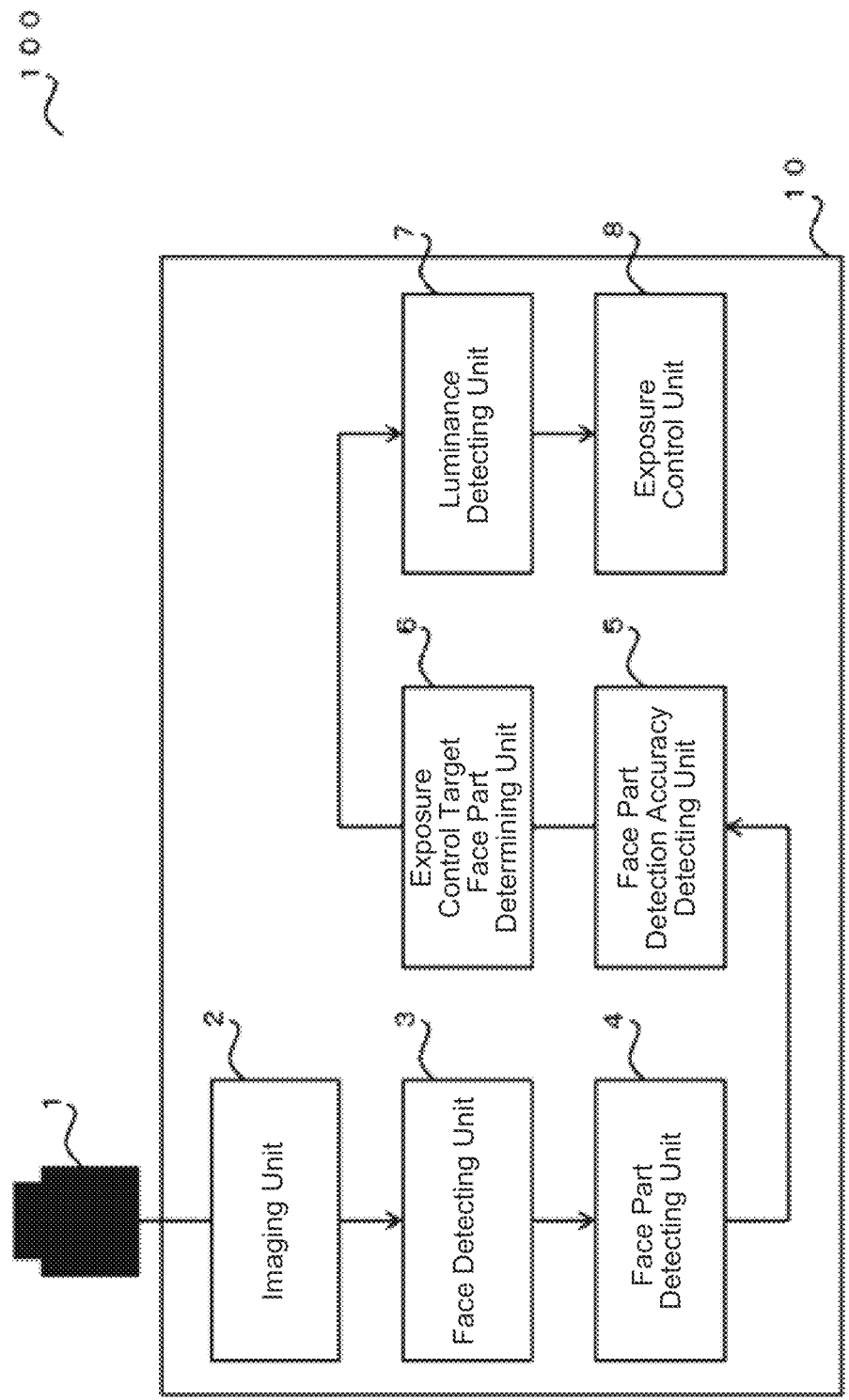
FIG. 1 is a schematic diagram of a DMS 100 to which an in-vehicle exposure control device 10 of a first embodiment is applied.

An in-vehicle exposure control device 10 and an exposure control method according to a first embodiment will be described with reference to FIGS. 1 to 6. FIG. 1 is a schematic diagram of a driver monitoring system (DMS) 100 to which the in-vehicle exposure control device 10 of the first embodiment is applied. The DMS 100 is mounted on a vehicle and performs various monitoring processes for occupants including a driver in the vehicle. Examples of the monitoring processes of the DMS 100 for an occupant include state determination of the occupant, personal authentication of the occupant, and the like.

The DMS 100 includes an imaging device 1 and the in-vehicle exposure control device 10 connected to the imaging device 1 via a network.

The imaging device 1 is a camera that captures an image of the occupant and outputs the captured image to the in-vehicle exposure control device 10.

The in-vehicle exposure control device 10 performs exposure control of a captured image output from the imaging device 1. The in-vehicle exposure control device 10 includes an imaging unit 2, a face detecting unit 3, a face part detecting unit 4, a face part detection accuracy detecting unit 5, an exposure control target face part determining unit 6, a luminance detecting unit 7, and an exposure control unit 8.

The imaging unit 2 acquires a captured image output from the imaging device 1. Then, the imaging unit 2 outputs the captured image to the face detecting unit 3.

The face detecting unit 3 detects face information of the occupant using the captured image output from the imaging unit 2. Then, the face detecting unit 3 outputs a detection result of detecting the face information to the face part detecting unit 4.

The face part detecting unit 4 detects face parts (for example, eyes, nose, mouth, and the like), which are feature points of face information necessary for the monitoring process, by using the detection result output from the face detecting unit 3. Then, the face part detecting unit 4 outputs detection results of detecting the face parts to the face part detection accuracy detecting unit 5.

The face part detection accuracy detecting unit 5 detects detection accuracy indicating accuracy of the detection results of the face parts by using the detection results output from the face part detecting unit 4. Then, the face part detection accuracy detecting unit 5 outputs a detection result of the detection accuracy to the exposure control target face part determining unit 6.

By using the detection result output from the face part detection accuracy detecting unit 5, the exposure control target face part determining unit 6 determines whether or not the detection accuracy has reached predetermined first detection accuracy, and selects a face part in which the detection accuracy has reached the first detection accuracy as an exposure control target face part as a target in which exposure is controlled. Then, the exposure control target face part determining unit 6 outputs the result to the luminance detecting unit 7.

Here, the first detection accuracy is detection accuracy that has not reached second detection accuracy necessary for the monitoring process, but enables detection accuracy of a face part to reach the second detection accuracy by controlling the exposure.

The luminance detecting unit 7 detects an average luminance of the exposure control target face part by using the result output from the exposure control target face part determining unit 6. Then, the luminance detecting unit 7 outputs the detection result of the average luminance to the exposure control unit 8.

The exposure control unit 8 controls exposure in such away that the average luminance approaches a predetermined target luminance by using the detection result detected by the luminance detecting unit 7.

Here, the target luminance is predetermined as luminance with which a face part can be detected with high detection accuracy, and is set to such luminance that the detection accuracy of the face part becomes equal to or higher than the second detection accuracy necessary for the monitoring process.

Figure 2:
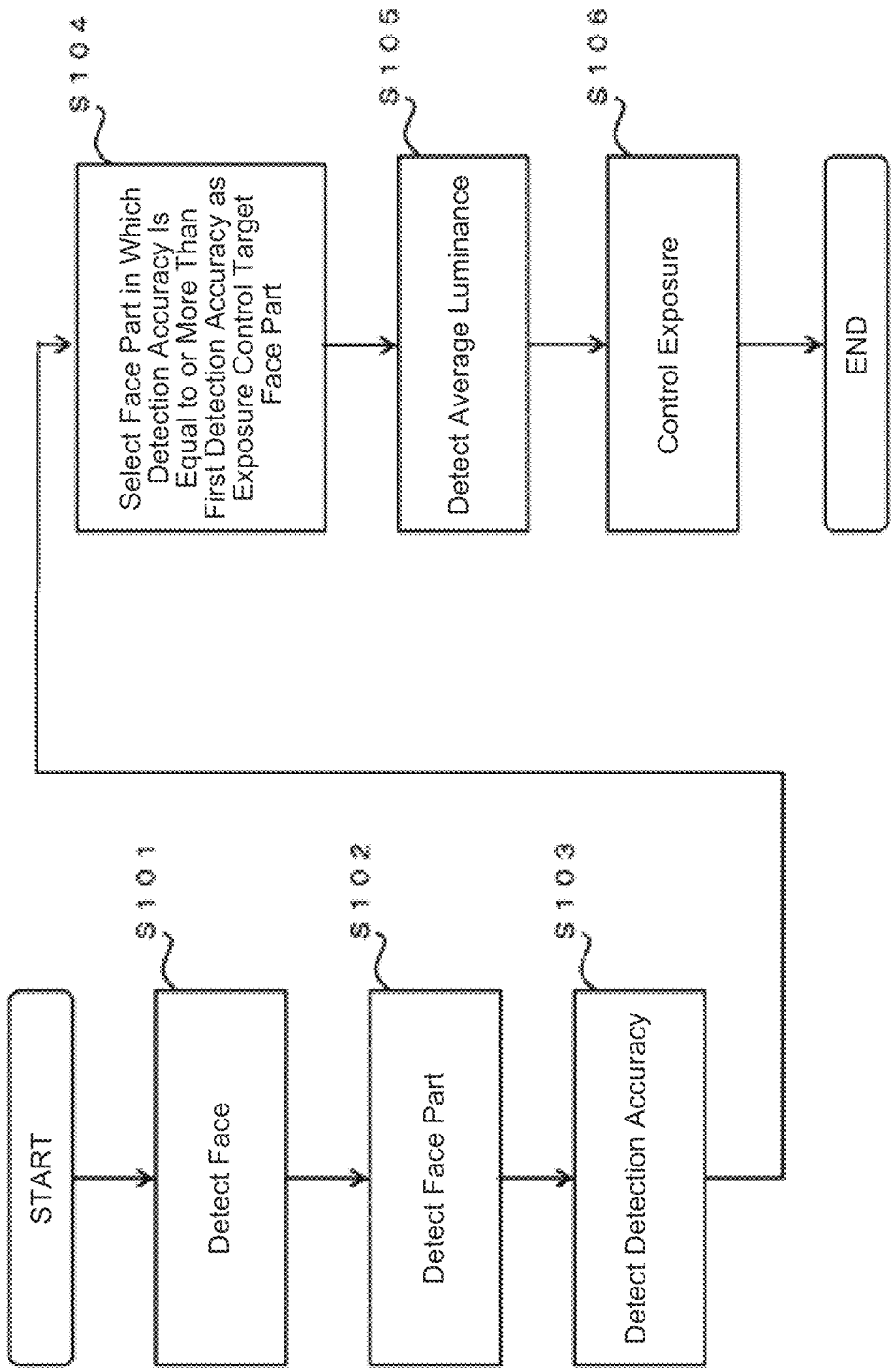
FIG. 2 is a flowchart of an exposure control method of the first embodiment.

Next, an exposure control method using the in-vehicle exposure control device 10 of the first embodiment will be described. FIG. 2 is a flowchart of an exposure control method of the first embodiment. The exposure control method of the first embodiment includes a step of acquiring a captured image of an occupant output from the imaging device 1 that captures an image of the occupant in the vehicle in a case where the occupant is wearing an accessory, step S101 of detecting face information of the occupant from the captured image, step S102 of detecting a face part from the face information, step S103 of detecting detection accuracy of the face part, step S104 of determining a face part in which the detection accuracy is equal to or more than predetermined detection accuracy as an exposure control target face part, step S105 of detecting average luminance of the exposure control target face part, and step S106 of controlling exposure in such a way that the average luminance approaches a target luminance.

In step S101 of detecting the face information of the occupant from the captured image, the face information of the occupant is detected using the captured image output in the step of outputting the captured image of the occupant output from the imaging device that captures an image of the occupant in the vehicle.

In step S102 of detecting the face part from the face information, the face part is detected using the face information of the occupant detected in step S101.

In step S103 of detecting the detection accuracy of the face part, the detection accuracy indicating the accuracy of the detection result of the face part is detected using the face part detected in step S102.

Here, the detection accuracy is detected, for example, by calculation on the basis of a ratio at which the position of the face part matches the position of the face part stored in advance.

In step S104 of determining a face part in which the detection accuracy is equal to or more than predetermined detection accuracy as an exposure control target face part, it is determined whether or not the detection accuracy has reached the predetermined first detection accuracy by using the detection accuracy of the face part detected in step S103, and the face part in which the detection accuracy has reached the first detection accuracy is selected as the exposure control target face part as a target in which exposure is controlled.

FIGS. 3 to 6 are diagrams illustrating examples of the exposure control target face part in step S104. A face part (exposure control target face part A) in which the detection accuracy has reached the first detection accuracy is surrounded by a square frame, and a face part (missing part B) in which the detection accuracy has not reached the first detection accuracy is surrounded by a filled square frame.

Figure 3:
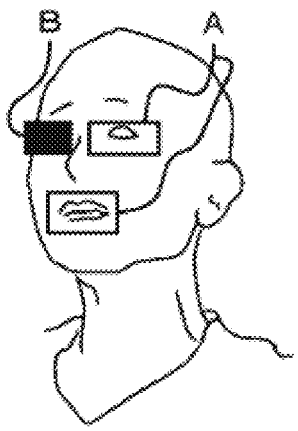
FIG. 3 is a diagram illustrating an example of an exposure control target face part in step S104.
Figure 4:
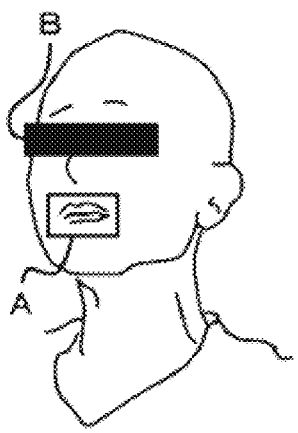
FIG. 4 is a diagram illustrating an example of the exposure control target face part in step S104.
Figure 5:
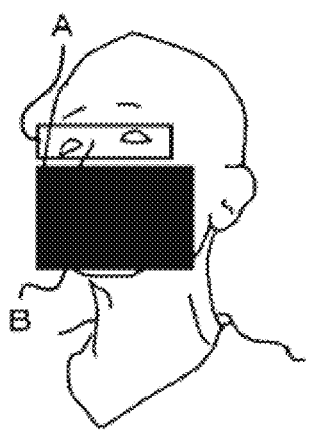
FIG. 5 is a diagram illustrating an example of the exposure control target face part in step S104.
Figure 6:
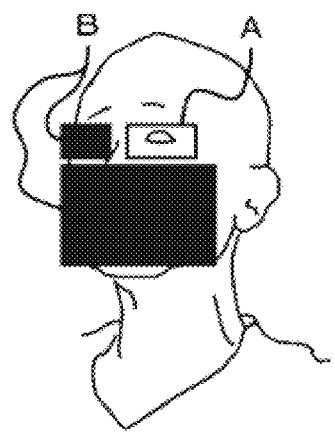
FIG. 6 is a diagram illustrating an example of the exposure control target face part in step S104.

FIG. 3 illustrates a case where the occupant's right eye is covered by an eye patch or the like. In this case, the uncovered left eye and mouth are determined as the exposure control target face part A. and the covered right eye is determined as the missing part B. FIG. 4 illustrates a case where both eyes of the occupant are covered by sunglasses or the like having low transmittance. In this case, the uncovered mouth is determined to be the exposure control target face part A, and since the transmittance of the sunglasses that cover the both eyes is low, it is not possible to detect the both eyes through the sunglasses, and thus the both eyes are determined to be the missing part B. FIG. 5 illustrates a case where the both eyes of the occupant are covered by sunglasses or the like having high transmittance, and the mouth is covered by a mask or the like. In this case, since the transmittance of the sunglasses that cover the both eyes is high, it is possible to detect the both eyes through the sunglasses, and thus if the detection accuracy of the detected both eyes reaches the first detection accuracy, the both eyes are determined as the exposure control target part A, and the covered mouth is determined as the missing part B. FIG. 6 illustrates a case where the right eye of the occupant is covered by an eye patch or the like, and the mouth is covered by a mask or the like. In this case, the uncovered left eye is determined as the exposure control target face part A, and the covered right eye and mouth are determined as the missing part B.

In step S105 of detecting the average luminance of the exposure control target face part, the average luminance of the exposure control target face part determined in step S104 is detected.

In step S106 of controlling the exposure in such away that the average luminance reaches the target luminance, in a case where the average luminance of the exposure control target face part detected in step S105 does not reach the predetermined target luminance, the exposure is controlled by adjusting exposure time and gain in such a way that the average luminance approaches the target luminance.

That is, in the exposure control method of the first embodiment, when the face part necessary for the monitoring process of the occupant is covered by an accessory, it is determined whether or not the detection accuracy of the face part has reached the first detection accuracy that is detection accuracy that can reach the second detection accuracy necessary for the monitoring process by controlling the exposure, the face part in which the detection accuracy has reached the first detection accuracy is set as the exposure control target face part, the average luminance of the exposure control target face part is detected, and the exposure is controlled in such a way that the average luminance approaches the target luminance. Thus, even in a case where the occupant is wearing various accessories including a mask, the exposure can be appropriately controlled, the monitoring process can be smoothed, and the accuracy can be enhanced. As a specific example, for example, even in a case where a mask and sunglasses are being worn at the same time as illustrated in FIG. 5, the exposure can be appropriately controlled.

As described above, since the in-vehicle exposure control device 10 and the exposure control method of the first embodiment detect the face part using the face information of the occupant, and control the exposure in such a way that the average luminance of the face parts in which the detection accuracy has reached the predetermined detection accuracy approaches the target luminance, there is an effect that the exposure can be appropriately controlled even in a case where the face part is covered by the occupant wearing the accessory.

Second Embodiment

Figure 7:
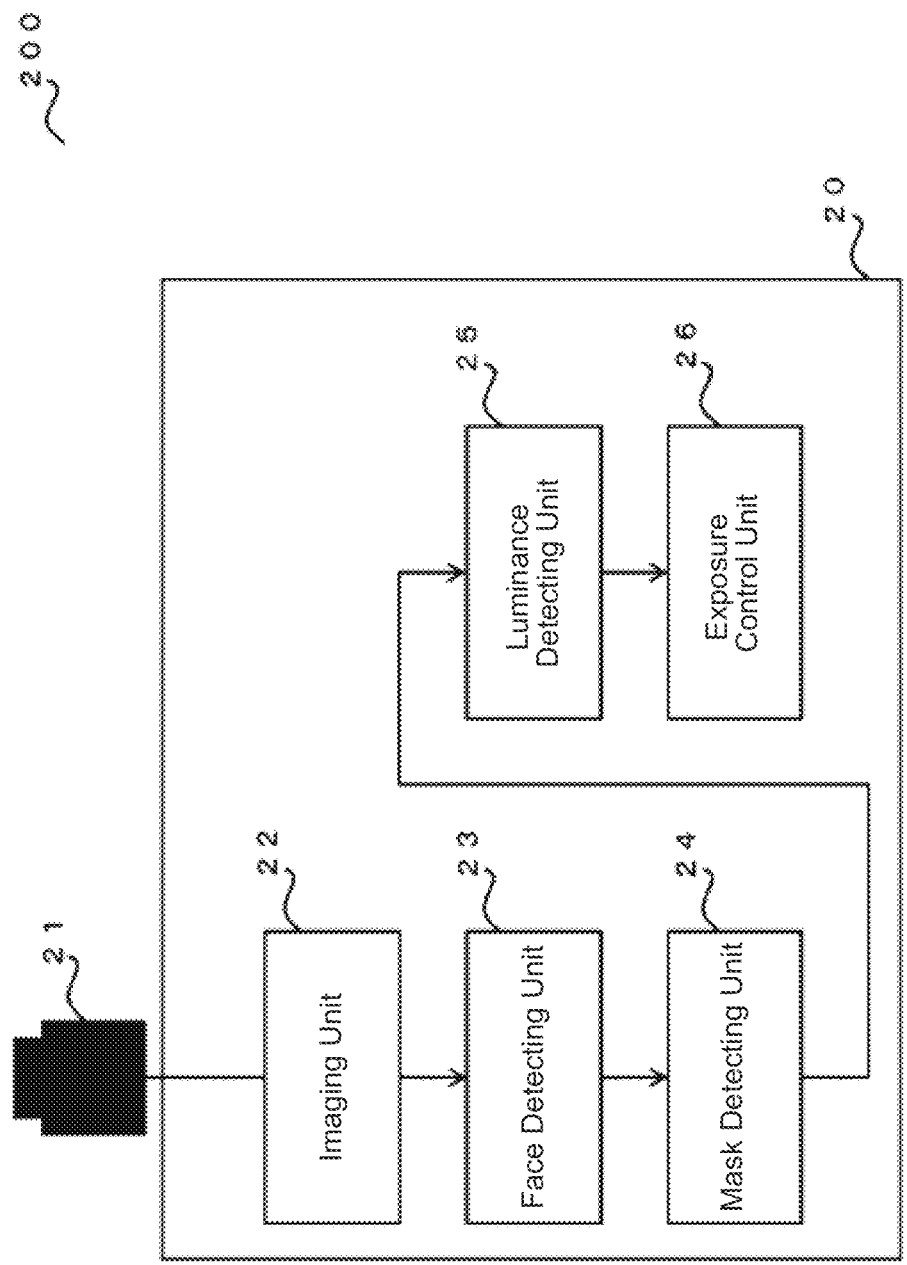
FIG. 7 is a schematic diagram of a DMS 200 to which an in-vehicle exposure control device 20 of a second embodiment is applied.
Figure 8:
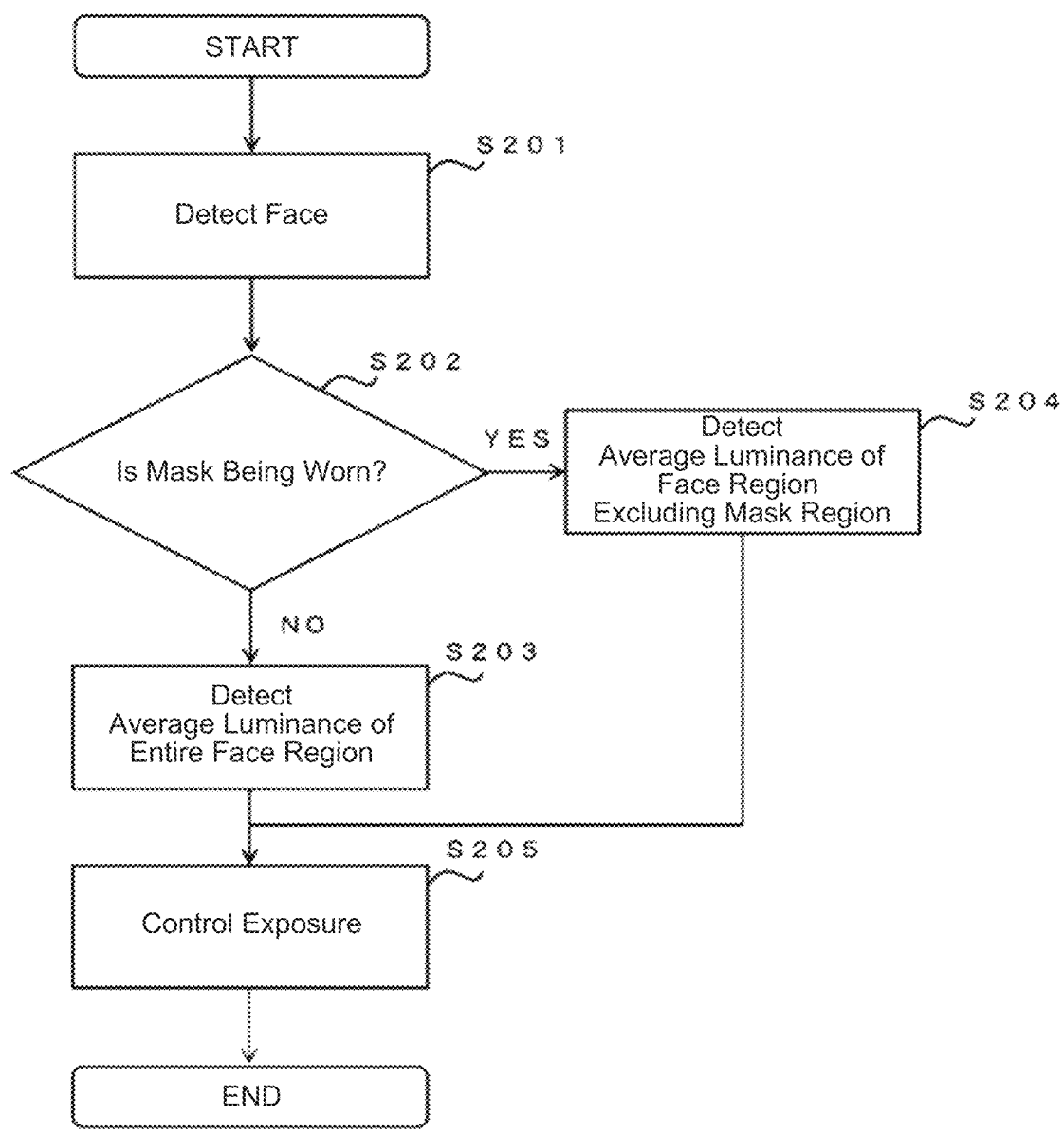
FIG. 8 is a flowchart of an exposure control method of the second embodiment.

An in-vehicle exposure control device 20 and an exposure control method according to a second embodiment will be described with reference to FIGS. 7 to 9. FIG. 7 is a schematic diagram of a DMS 200 to which the in-vehicle exposure control device 20 of the second embodiment is applied. As illustrated in FIG. 7, it is different from the first embodiment in that a mask detecting unit 24 is provided, but other components except for the face part detecting unit 4, the face part detection accuracy detecting unit 5, and the exposure control target face part determining unit 6 are similar to those of the first embodiment.

The mask detecting unit 24 compares face information output from the face detecting unit 23 with face information stored in advance, and detects whether or not a mask is being worn. Then, the mask detecting unit 24 outputs the detection result to the luminance detecting unit 25.

The luminance detecting unit 25 detects the average luminance of a region E excluding a mask region D in a face region C when the detection result output from the mask detecting unit 24 indicates that the mask is being worn, and detects the average luminance of the face region C when the mask is not being worn. Then, the luminance detecting unit 25 outputs the detection result of the average luminance to the exposure control unit 26.

The exposure control unit 26 controls the exposure in such a way that the average luminance approaches the target luminance by using the detection result output from the luminance detecting unit 25.

Next, an exposure control method using the in-vehicle exposure control device 20 of the second embodiment will be described. FIG. 8 is a flowchart of an exposure control method of the second embodiment. The exposure control method of the second embodiment includes a step of acquiring a captured image of an occupant, the captured image being output from an imaging device that captures an image of the occupant in a vehicle in a case where the occupant is wearing an accessory, step S201 of detecting face information of the occupant from the captured image, step S202 of detecting whether or not the occupant is wearing a mask from the face information, step S203 of detecting average luminance of a region excluding a mask region covered by the mask in a face region included in the face information in a case where it is detected that the mask is being worn, step S204 of detecting average luminance of the face region C in a case where it is detected that the mask is not being worn, and step S205 of controlling the exposure in such a way that the average luminance approaches a target luminance.

In step S201 of detecting the face information of the occupant from the captured image, the face information of the occupant is detected using the captured image output in the step of outputting the captured image of the occupant output from the imaging device that images the occupant in the vehicle.

In step S202 of detecting whether or not the occupant is wearing the mask from the face information, the face information detected in step S201 is compared with the previously stored face information to detect whether or not the mask is being worn.

Here, the face information stored in advance is, for example, face information in a case where the occupant is not wearing a mask or face information in a case where the occupant is wearing a mask. The mask being worn by the occupant stored in advance in the face information has various colors such as a white-based mask including a relatively light color such as yellow or light blue, and a black-based mask including a relatively dark color such as dark blue or brown, in addition to white.

In a case where it is detected in step S202 that the mask is being worn, the process proceeds to step S203 of detecting the average luminance of the region excluding the mask region covered by the mask in the face region included in the face information. In step S203, the average luminance of the region E excluding the mask region D in the face region C is detected.

In a case where it is detected in step S202 that the mask is not being worn, the process proceeds to step S204 of detecting the average luminance of the face region C. In step S204, the average luminance of the face region C is detected.

Figure 9:
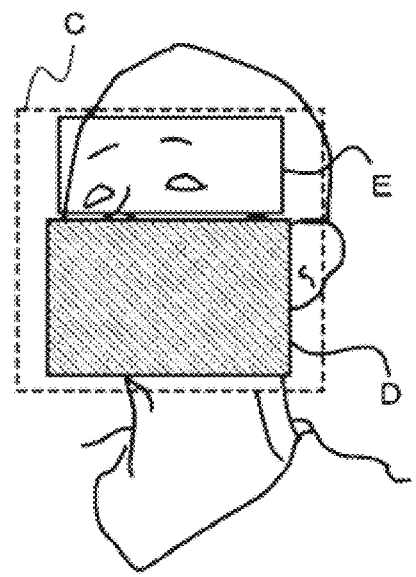
FIG. 9 is a diagram illustrating a range of each region detected in steps S203 and S204.

FIG. 9 is a diagram illustrating a range of each region detected in steps S203 and S204. The face region C is a region of the face information of the occupant, and is a range indicated by a dotted frame. Next, the mask region D is a region covered by the mask in the face region C, and is a range where the inside of the solid line frame is indicated by hatching. Finally, the region E is a region of the face region C excluding the mask region D. and is a range indicated by a solid line frame.

In step S205 of controlling the exposure in such a way that the average luminance approaches the target luminance, in a case where the average luminance detected in steps S203 and S204 does not reach the target luminance, the exposure is controlled by adjusting the exposure time and the gain in such a way that the average luminance approaches the target luminance.

That is, in the exposure control method of the second embodiment, in a case where the face part necessary for the monitoring process of the occupant is covered by a mask, whether or not the mask is being worn is detected by comparing the detected face information of the occupant with the previously stored face information, the region where the average luminance is detected is changed depending on whether or not the mask is being worn, and the exposure is controlled in such a way that the average luminance of the region approaches the target luminance. Thus, even in a case where the occupant is wearing the mask, the exposure can be appropriately controlled, the monitoring process can be smoothed, and the accuracy can be enhanced.

As described above, the in-vehicle exposure control device 20 and the exposure control method of the second embodiment detect whether or not the mask is being worn using the face information of the occupant, change the region where the average luminance is detected depending on whether or not the mask is being worn, and control the exposure in such a way that the average luminance of the region approaches the target luminance, and thus there is an effect that the exposure can be appropriately controlled even in a case where the face part is covered by the occupant wearing the mask.

In addition, in a case of detecting whether or not the occupant is wearing the mask, whether or not the occupant is wearing the mask can be detected with high accuracy by comparing the face information detected in step S201 with the face information stored in advance.

Third Embodiment

Figure 10:
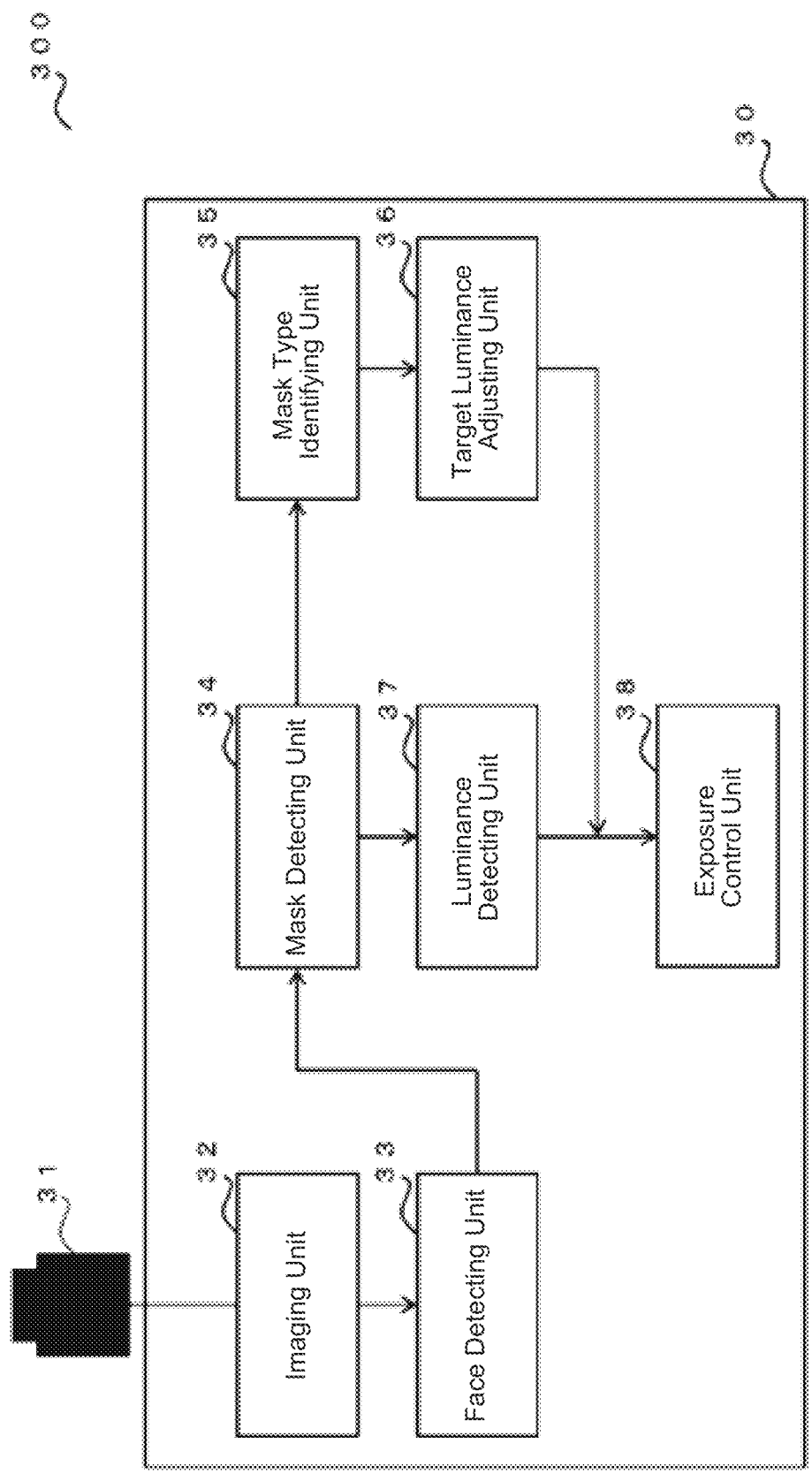
FIG. 10 is a schematic diagram of a DMS 300 to which an in-vehicle exposure control device 30 of a third embodiment is applied.
Figure 11:
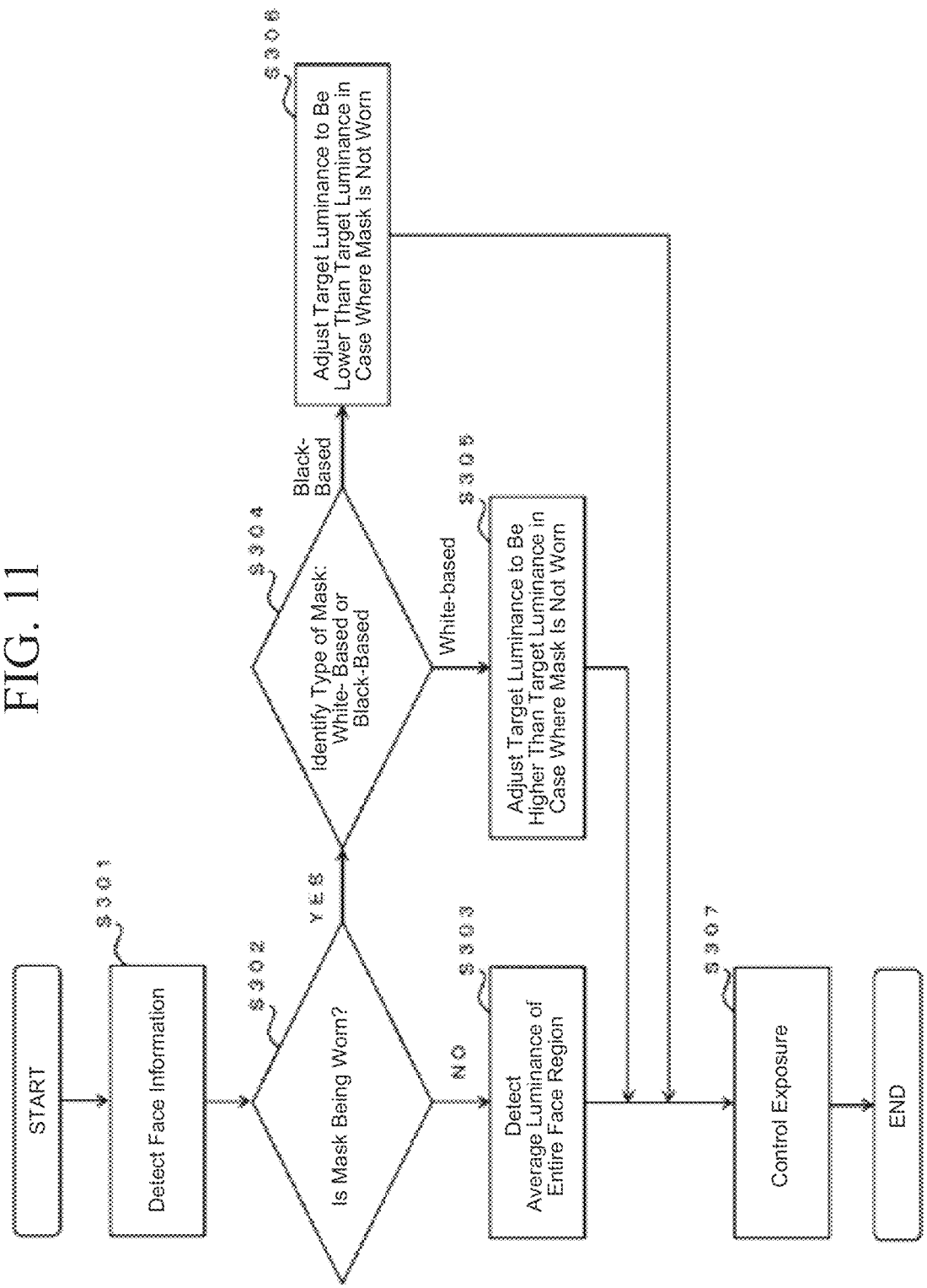
FIG. 11 is a flowchart of an exposure control method of the third embodiment.

An in-vehicle exposure control device 30 and an exposure control method according to a third embodiment will be described with reference to FIGS. 10 and 11. FIG. 10 is a schematic diagram of a DMS 300 to which the in-vehicle exposure control device 30 of the third embodiment is applied. As illustrated in FIG. 10, it is different from the second embodiment in that a mask type identifying unit 35 and a target luminance adjusting unit 36 are provided, but the other components are similar to those of the second embodiment.

The mask detecting unit 34 compares face information output from the face detecting unit 33 with face information stored in advance, and detects whether or not the mask is being worn. Then, the mask detecting unit 34 outputs the detection result to the luminance detecting unit 37. Further, in a case where the mask detecting unit 34 detects that the mask is being worn, the detection result is output to the mask type identifying unit 35.

The mask type identifying unit 35 identifies the type of the mask by using the detection result that the mask is being worn, the detection result being output from the mask detecting unit 34. Then, the mask type identifying unit 35 outputs the identification result to the target luminance adjusting unit 36.

The target luminance adjusting unit 36 adjusts the target luminance according to the identified mask by using the identification result output from the mask type identifying unit 35. Then, the target luminance adjusting unit 36 outputs the adjusted target luminance to the exposure control unit 38.

The exposure control unit 38 controls the exposure in such a way that the average luminance approaches the target luminance by using the detection result output from the luminance detecting unit 37. However, in a case where the target luminance is adjusted by the target luminance adjusting unit 36, the exposure is controlled in such a way that the average luminance approaches the adjusted target luminance output from the target luminance adjusting unit 36.

Next, an exposure control method using the in-vehicle exposure control device 30 of the third embodiment will be described. FIG. 11 is a flowchart of the third embodiment. The exposure control method of the third embodiment includes a step of acquiring a captured image of an occupant, the captured image being output from an imaging device that captures an image of the occupant in a vehicle in a case where the occupant is wearing an accessory, step S301 of detecting face information of the occupant from the captured image, step S302 of detecting whether or not the occupant is wearing a mask from the face information, step S303 of detecting an average luminance of a face region included in the face information in a case where it is detected that the mask is not being worn, step S307 of controlling exposure in such a way that the average luminance approaches a target luminance, step S304 of identifying a type of the mask in a case where it is detected that the mask is being worn, step S305 of adjusting, in a case where the type of the mask is identified as a white-based mask, the target luminance to be higher than the target luminance in a case where the mask is not being worn, and step S306 of adjusting, in a case where the type of the mask is identified as a black-based mask, the target luminance to be lower than the target luminance in a case where the mask is not being worn.

In a case where it is detected that the mask is being worn, in step S304 of identifying the type of the mask, the type of the mask is identified.

Here, the method of identifying the type of the mask is, for example, a method of detecting the color of the mask from reflectance of the mask. A mask having reflectance equal to or more than a certain value can be classified as a white-based mask, and a mask having reflectance equal to or less than the certain value can be classified as a black-based mask. In addition to white mask, the white-based mask includes relatively light color masks such as yellow mask and light blue mask. In addition to black mask, the black-based mask includes relatively dark color masks such as dark blue mask or brown mask. In addition, the type of the mask may be identified on the basis of comparison between the information of the detected mask and information of a plurality of types of masks stored in advance.

In a case where the type of the mask is identified as the white-based mask, the process proceeds to step S305 of adjusting the target luminance to be higher than the target luminance in a case where the mask is not being worn. In a case where the white-based mask is being worn, the white-based mask is detected to have luminance higher than that of other face regions, and thus, in step S305, the target luminance is adjusted to be higher than that in a case where the mask is not being worn.

In a case where the type of the mask is identified as the black-based mask, the process proceeds to step S306 of adjusting the target luminance to be lower than the target luminance in a case where the mask is not being worn. In a case where the black-based mask is being worn, the black-based mask is detected to have luminance lower than that of other face regions, and thus, in step S306, the target luminance is adjusted to be lower than that in the case of no mask.

In step S307 of controlling the exposure in such a way that the average luminance approaches the target luminance, in a case where the average luminance detected in step S303 does not reach the target luminance, the exposure is controlled by adjusting the exposure time and the gain in such a way that the average luminance approaches the target luminance. However, in a case where the target luminance is adjusted in step S305 or step S306, the exposure is controlled in such a way that the average luminance approaches the target luminance adjusted in steps S305 and S306.

That is, in the exposure control method of the third embodiment, the type of the mask being worn by the occupant is identified, the target luminance is adjusted depending on the type, and the exposure is controlled on the basis of the target luminance. Therefore, the exposure can be appropriately controlled regardless of the type of mask, and the monitoring processing can be smoothed and the accuracy can be improved.

As described above, in addition to the effects of the second embodiment, the in-vehicle exposure control device and the exposure control method of the third embodiment identify the type of the detected mask, adjust the target luminance according to the identified type, and control the exposure on the basis of the target luminance, so that not only whether or not the occupant is wearing a mask can be accurately determined, but also the exposure can be appropriately controlled depending on the type of the mask, and thus there is an effect that the exposure can be appropriately controlled even in a state where the occupant is wearing an accessory and covers the face part.

REFERENCE SIGNS LIST 1, 21, 31: imaging device, 2, 22, 32: imaging unit, 3, 23, 33: face detecting unit, 4: face part detecting unit, 5: face part detection accuracy detecting unit, 6: exposure control target face part determining unit, 7, 25: luminance detecting unit, 8, 26: exposure control unit, 10, 20, 30: in-vehicle exposure control device, 14, 34: mask detecting unit, 35: mask type identifying unit, 36: target luminance adjusting unit, 100, 200, 300: DMS, A: exposure control target part, B: missing part, C: face region, D: mask region, E: region

The invention claimed is:

1. An in-vehicle exposure control device, comprising:
an image acquisitor to acquire a captured image of a driver of the vehicle, the captured image being output from an imaging device that captures an image of the driver in the vehicle;
a face part detector to detect one or more face parts of the driver from the captured image acquired by the image acquisitor;
a face part detection accuracy detector to detect detection accuracy of each face part detected by the face part detector;
a luminance detector to detect a first luminance, which is the luminance of at least one face part of the driver in the captured image, detected by the face part detector whose detection accuracy as detected by the face part detection accuracy detector is equal to or more than a predetermined detection accuracy;
an exposure controller to control exposure by adjusting exposure time and gain in such a way that the detected luminance of the at least one face part detected by the luminance detector is a target luminance, and
wherein the captured image is acquired and processed by a driver monitoring system (DMS) to monitor a state of the driver while the driver is driving the vehicle, and
the luminance detector detects luminance of the face of the driver as the first luminance, in a case where the face of the driver is not covered by an accessory, and detects luminance of a region of the face excluding a part of the face that is covered by an accessory as the first luminance, in a case where the part of the face of the driver is covered by the accessory.

2. An in-vehicle exposure control device, comprising:
an image acquisitor to acquire a captured image of an occupant, the captured image being output from an imaging device that captures an image of the occupant in a vehicle;
a face detector to detect face information of the occupant from the captured image acquired by the image acquisitor;
a luminance detector to detect a first luminance, which is the luminance of a face or a part of the face of the occupant in the captured image, by using the face information detected by the face detector;
an exposure controller to control exposure in such a way that the first luminance detected by the luminance detector is target luminance;
a mask detector to detect whether or not the occupant is wearing a mask as the accessory by using the face information detected by the face detector;
a mask type identifier to identify a type of the mask in a case where the mask detector detects that the occupant is wearing the mask; and
a target luminance adjuster to adjust the target luminance in exposure control by the exposure controller,
wherein
the luminance detector detects luminance of the face of the occupant as the first luminance, in a case where the face of the occupant is not covered by an accessory, and detects luminance of a region of the face excluding a part of the face that is covered by an accessory as the first luminance, in a case where the part of the face of the occupant is covered by the accessory, the luminance detector detects luminance of a region of the face of the occupant excluding a part of the face that is covered by the mask as the first luminance, in a case where the mask detector detects that the occupant is wearing the mask, and detects luminance of the face of the occupant as the first luminance, in a case where the mask detector detects that the occupant is not wearing the mask, the exposure controller controls the exposure in such a way that the first luminance is first target luminance included in the target luminance, in a case where the mask detector detects that the occupant is not wearing the mask, and controls the exposure in such a way that the first luminance is second target luminance included in the target luminance and different from the first target luminance, in a case where the mask detector detects that the occupant is wearing the mask, and the target luminance adjuster adjusts the second target luminance in such a way as to be larger than the first target luminance, in a case where the mask type identifier identifies the type of the mask as a white-based mask, and adjusts the second target luminance in such a way as to be smaller than the first target luminance, in a case where the mask type identifier identifies the type of the mask as a black-based mask.

3. The in-vehicle exposure control device according to claim 2, further comprising:
   a face part detector to detect a face part from the face information detected by the face detector;
   a face part detection accuracy detector to detect detection accuracy of the face part detected by the face part detector; and
   an exposure control target face part determiner to determine, as an exposure control target face part which is not covered by the accessory, a face part in which the detection accuracy of the face part detected by the face part detection accuracy detector is equal to or more than predetermined detection accuracy, and output a determination result, wherein
   the luminance detector sets, as a face part which is not covered by the accessory in the face of the driver, the exposure control target face part, by using the determination result outputted by the exposure control target face part determiner, and detects luminance of the face part as the first luminance.

4. An exposure control method, comprising:
   acquiring a captured image of a driver of a vehicle, the captured image being output from an imaging device that captures an image of the driver in the vehicle;
   detecting one or more face parts of the driver from the captured image acquired; detecting detection accuracy of each detected face part;
   detecting a first luminance, which is the luminance of at least one detected face of the driver in the captured image whose detected detection accuracy is equal to or more than a predetermined detection accuracy;
   controlling exposure by adjusting exposure time and gain in such a way that the detected first luminance of the at least one detected face part is target luminance, wherein the captured image is acquired and processed by a driver monitoring system (DMS) to monitor a state of the driver while the driver is driving the vehicle, and
   luminance of the face of the driver is detected as the first luminance, in a case where the face of the driver is not covered by an accessory, and luminance of a region of the face excluding a part of the face that is covered by an accessory is detected as the first luminance, in a case where the part of the face of the driver is covered by the accessory.

* * * * *